United States Patent
Hayrynen et al.

(10) Patent No.: US 9,258,320 B2
(45) Date of Patent: Feb. 9, 2016

(54) SYSTEM FOR TESTING COMPUTER APPLICATION

(71) Applicant: Codenomicon Oy, Oulu (FI)

(72) Inventors: Antti Hayrynen, Oulu (FI); Marko Laakso, Oulu (FI); Rauli Kaksonen, Oulu (FI)

(73) Assignee: SYNOPSYS, INC., Mountain View, CA (US)

( * ) Notice: Subject to any disclaimer, the term of this patent is extended or adjusted under 35 U.S.C. 154(b) by 7 days.

(21) Appl. No.: 14/161,306

(22) Filed: Jan. 22, 2014

(65) Prior Publication Data

US 2014/0215620 A1    Jul. 31, 2014

(30) Foreign Application Priority Data

Jan. 25, 2013    (EP) .................................... 13152670

(51) Int. Cl.
    *H04L 29/06*    (2006.01)
    *G06F 21/56*    (2013.01)

(52) U.S. Cl.
    CPC ............ *H04L 63/1416* (2013.01); *G06F 21/56* (2013.01); *G06F 2221/033* (2013.01)

(58) Field of Classification Search
    None
    See application file for complete search history.

(56) References Cited

U.S. PATENT DOCUMENTS

| | | |
|---|---|---|
| 8,090,393 B1 | 1/2012 | Whitehouse |
| 8,356,352 B1 | 1/2013 | Wawda et al. |
| 2003/0023866 A1* | 1/2003 | Hinchliffe et al. ............ 713/200 |
| 2004/0210769 A1* | 10/2004 | Radatti et al. ................. 713/201 |
| 2005/0187740 A1 | 8/2005 | Marinescu |
| 2006/0015940 A1 | 1/2006 | Zamir et al. |
| 2006/0021029 A1 | 1/2006 | Brickell et al. |
| 2006/0236393 A1 | 10/2006 | Kramer et al. |
| 2007/0174915 A1 | 7/2007 | Gribble et al. |
| 2008/0222728 A1 | 9/2008 | Chavez et al. |
| 2009/0150997 A1 | 6/2009 | Park et al. |
| 2011/0185429 A1 | 7/2011 | Sallam |

FOREIGN PATENT DOCUMENTS

| | | |
|---|---|---|
| EP | 1280040 | 1/2003 |
| GB | 2283341 | 5/1995 |
| WO | WO2007107766 | 9/2007 |

* cited by examiner

*Primary Examiner* — David Le
*Assistant Examiner* — Devin Almeida
(74) *Attorney, Agent, or Firm* — Hollingsworth Davis, LLC

(57) ABSTRACT

This document discloses a method, apparatus, and computer program product for testing a computer program application in a server computer. The method comprises: receiving, from a client device, a test request requesting the server computer to test suspicious behavior associated with the computer program application; acquiring the computer program application on the basis of the test request; applying at least one test routine to the computer program application and testing for suspicious behavior associated with the computer program application; creating a test report specifying at least some features of the suspicious behavior, if any found during the at least one test routine; and communicating the test report to the client device.

19 Claims, 4 Drawing Sheets

SYSTEM FOR TESTING COMPUTER APPLICATION

FIELD

The invention relates to the field of computer programs and, particularly, a system for testing a computer application.

BACKGROUND

With the emergence of personal smart computing devices such as smart phones and tablet computers, new types of applications have also appeared. Today, there are several applications stores and users want to select and install the applications on their devices. Applications in such stores are provided by different vendors or individual persons. This may raise a security concern, because a user installing the application has limited ability to verify whether or not the application is provided by a trusted vendor and because making the applications is relatively easy. This may open up a venue for malicious or ignorant vendors or individual people to offer applications that may be referred to as malicious software (malware). Security risk is raised by the fact that mobile computing devices have limited or no anti-malware software.

BRIEF DESCRIPTION

According to an aspect, there is provided a method for testing a computer program application in a server computer, the method comprising: receiving, from a client device, a test request requesting the server computer to test suspicious behaviour associated with the computer program application; acquiring the computer program application on the basis of the test request; applying at least one test routine to the computer program application and testing for suspicious behaviour associated with the computer program application; creating a test report specifying at least some features of the suspicious behaviour, if any found during the at least one test routine; and communicating the test report to the client device.

According to another aspect, there is provided an apparatus comprising at least one processor; and at least one memory storing a computer program code. The at least one memory and the computer program code are configured, with the at least one processor, to cause the apparatus to: receive, from a client device, a test request requesting the apparatus to test suspicious behaviour associated with a computer program application; acquire the computer program application on the basis of the test request; apply at least one test routine to the computer program application and test for suspicious behaviour associated with the computer program application; create a test report specifying at least some features of the suspicious behaviour, if any found during the at least one test routine; and communicate the test report to the client device.

According to yet another aspect, there is provided a computer program product embodied on a non-transitory distribution medium readable by a computer and comprising program instructions which, when loaded into an apparatus, execute a computer process comprising: receiving, from a client device, a test request requesting the apparatus to test suspicious behaviour associated with a computer program application; acquiring the computer program application on the basis of the test request; applying at least one test routine to the computer program application and testing for suspicious behaviour associated with the computer program application; creating a test report specifying at least some features of the suspicious behaviour, if any found during the at least one test routine; and communicating the test report to the client device.

Embodiments of the invention are defined in the dependent claims.

LIST OF DRAWINGS

Embodiments of the present invention are described below, by way of example only, with reference to the accompanying drawings, in which FIGS. 1A and 1B illustrate computing environments to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
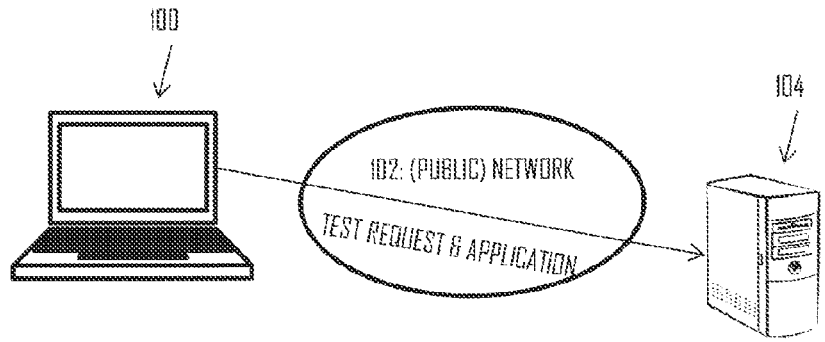

FIG. 1A illustrates a computing environment to which embodiments of the invention may be applied. Embodiments of the invention provide a system for checking for suspicious behaviour of a computer program application in a secured environment. The secured environment may be created in a server computer 104 running sophisticated monitoring software configured to monitor for the behaviour of the application that may be called suspicious. In an embodiment, the server computer 104 may assign at least some of the monitoring task(s) to further computers. The suspicious may refer to features or operations that are beyond of what the user expects from the application. Typical suspicious behaviour may comprise the application stealing data from the user's personal computing device, making payments without user consent using the user's personal computing device for e-mail spamming or for other illegal activity, or the suspicious features may comprise software licenses or other obligations that the user may not expect.

The user may provide the application for testing for the suspicious behaviour in the server computer 104 before installing the application to the user's own personal computing device 100. In another embodiment, a creator of the application may provide the application for the same testing in order to verify that the application complies with required security standards and to check for various security vulnerabilities in the application. Referring to FIG. 1A the user may use his/her personal computing device 100 to communicate with the server computer over a network 102, e.g. the Internet or another computer network, and send a test request to the server computer 104 to request the server computer 104 to test the indicated application for the suspicious behaviour. The test request may comprise one or more messages transferred between the personal computing device 100 and the server computer 104. In the embodiment of FIG. 1A, the user may upload the application in connection with the request from the personal computing device 100 to the server computer. The application uploaded from the mobile computing device 100 to the server computer 104 may comprise an installation package of the application or the application in another compact typically used to pack the application prior to installing it.

Figure 1B:
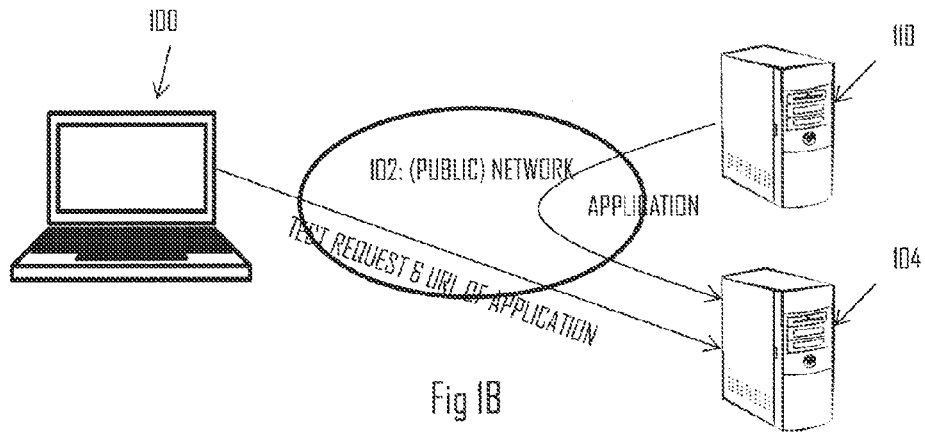

In the embodiment of FIG. 1B, the user may provide the server computer 104 with a uniform resource identifier (URI) specifying a location from where the server computer 104 may retrieve the application. The application may in this embodiment be located in a different computer 110 than that used by the user to send the test request. The computer 110 storing the application may be an application store or another server computer, for example. The URI may be an uniform resource locator specifying the location of the application explicitly in the computer network, or it may be another identifier that explicitly identifies the application requested for testing. The identifier may be a name of the application in a specific application store, for example. In any case, the server computer uses the URI received from the personal computing device to retrieve the application from the computer 110 storing the application, e.g. the installation package of the application.

The personal computing device 100 may be a personal computer (PC), a desktop computer, a laptop computer, a palm computer, a smart phone, a tablet computer, or another computer. In general, the personal computing device 100 may be called a client device in the sense that it is a client that receives an application testing service from the server computer 104. The server computer 104 may be a network server connected to the computer network 102. The server computer may provide the user of the personal computing device with a web-based interface (in hypertext markup language, for example) for sending the test request and providing the application for testing. The personal computing device 100 and the server computer 104 are preferably two physically separate devices.

Figure 2:
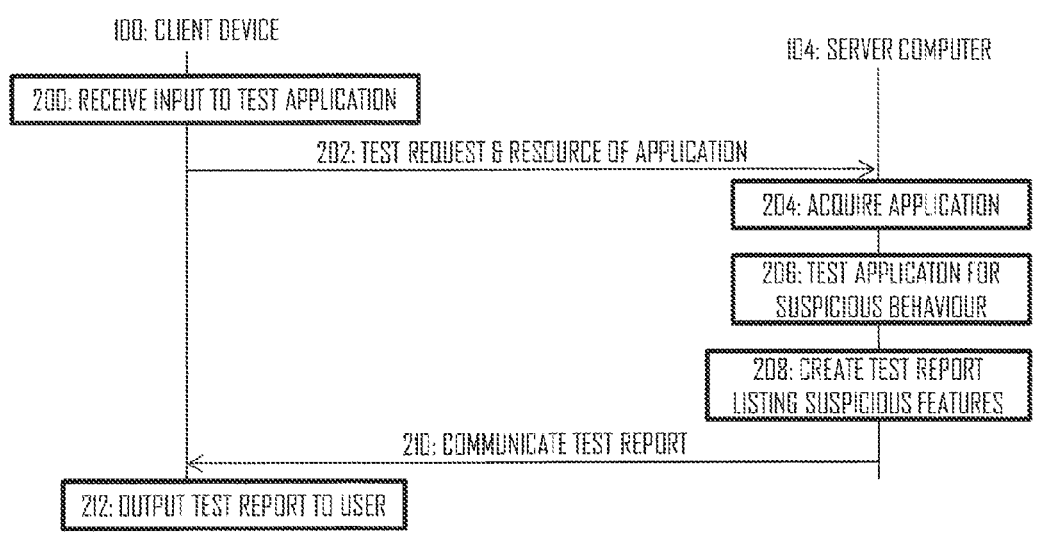
FIG. 2 illustrates a signaling diagram for testing an application according to an embodiment of the invention.

FIG. 2 illustrates a signaling diagram of a procedure for testing the application for the suspicious behaviour according to an embodiment of the invention. The procedure comprises operations performed by the client device 100, operations performed by the server computer 104, and communication between the client device 100 and the server computer 104.

Referring to FIG. 2, the client device 100 receives an input for testing whether or not suspicious behaviour is associated with a computer program application (block 200). The input may be a user input received through a user interface of the client device 100. The user input may relate to the user accessing the server computer 104 and instructing the client device to prepare the above-described test request and to retrieve a resource of the application to be tested. The retrieval of the resource may be retrieval of the application from a memory location of the client device 100 or retrieval of an URI of the application. In step 202, the client device 100 sends the test request and the resource of the application to the server computer 104, and the server computer receives the test request. In block 204, the server computer 104 acquires the computer program application on the basis of the test request. In the embodiment where the client device uploads the application together with the test request, the server computer 104 receives the application directly from the client device 100. In the embodiment where the client device provides the URI of the application, the server computer accesses the URI and transfers the application from another computer 110 storing the application.

In block 206, the server computer applies at least one test routine to the application and tests the application for suspicious behaviour. The server computer 104 may store a database specifying features of the suspicious behaviour used as input reference parameters for the test routine(s). The test routine(s) may check the application for the features defined in the database. Below, detailed examples of the suspicious features operations are described. The test routines may comprise computer program modules executed in the server computer to test the application. Each test routine may check the application for one or more types of the suspicious behaviour. On the basis of the execution of the test routines, the server computer 104 creates a test report specifying at least some features of the suspicious behaviour (block 208), if any found during the test routines. The test report may specify whether or not the application is known to carry out malicious operation, whether or not the application contains licenses obligating the user, whether or not the application contains security vulnerabilities that may be exploited by a malware or an adversary (a malicious entity or party), whether or not the application contains certificates that come from untrusted parties, etc. The details of the test report may depend on the embodiment, the level of detail requested by the client device 100, etc., but preferably the test report comprise more information than a simple indication of whether or not the application comprises suspicious behaviour. In step 210, the server computer 104 sends the test report to the client device 100, and the client device 100 receives the test report. The client device 100 outputs the test report to the user in block 212, e.g. through the user interface. The test report may be provided during the same computer session in which the client device sends the test request, or the server computer 104 may send the test report after the session has ended, e.g. after the user has logged out from the session. The test report or a notification of the completion of the test report may be sent to the user via e-mail, for example, and/or the user may acquire the test report by logging onto his/her account in the server computer 104 later.

In the embodiments where the server computer uses worker computer to carry out the actual testing, the server computer may assign the at least one test routine to the application and instruct the worker computer(s) to carry out the actual testing and notify the completion of the testing to the server computer 104. The server may then acquire or create the test report.

Figure 3:
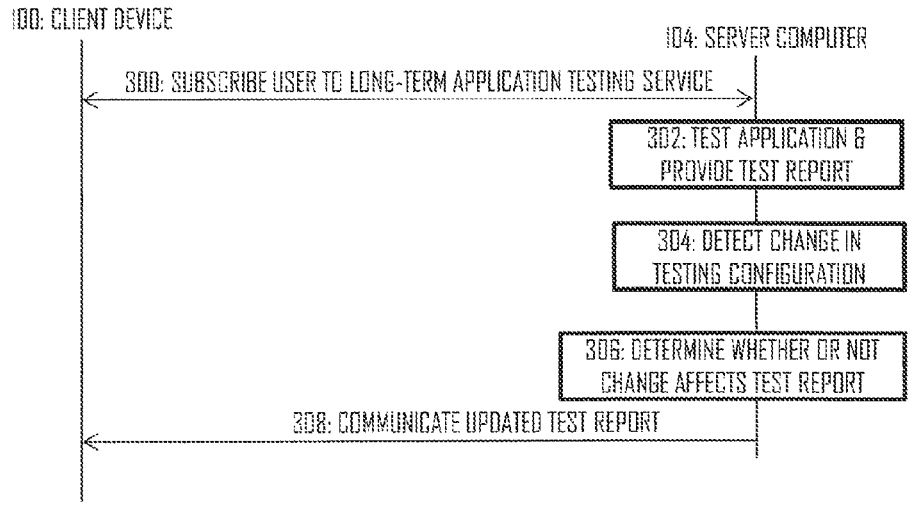
FIGS. 3 and 4 illustrate a procedure for providing a subscription service and retesting the application upon detecting a change in a testing configuration according to some embodiments of the invention.

In an embodiment, the server computer provides the user with a subscription to a long-term application testing service. The long-term may be defined to last for a longer term than the procedure of FIG. 2, i.e. the subscription may last beyond the provision of the single test report. FIG. 3 illustrates a procedure for applying the long-term subscription. Referring to FIG. 3, the user of the client device 100 is registered to a long-term application testing service in step 300. This may comprise creating a user account, storing in the user account user credentials and identifier of at least one application associated with the application testing service. In block 302, the server computer tests the application for the suspicious behaviour and provides the test report. Block 302 may comprise substantially the operations performed in the procedure of FIG. 2. The server computer may store contents of the test report, any test configurations, final test results, intermediate test results, any detected features or functions of the application, or any other relevant test information in a test result database for later retrieval.

After a given time has elapsed after the provision of the test report, the server computer may detect a change in the testing configuration of the application tested in block 302 or, in general, any application stored in any user account in the server computer (block 304). The change may be notified by the user, or the server computer 104 may detect the change on its own. In block 306, the server computer 104 determines whether or not the change affects the contents of the test report. In some embodiments, the server computer may rerun at least some of the test routines or new test routines, while in other embodiments the server computer 104 may determine the changes to the test result from the contents of the test result database. Upon determining that the change affects the contents of the test report, the server computer 104 may update the test report by taking into account the changes in the testing configuration and communicate the updated test report to the user's client device 100 in step 308.

With the subscription service, the user receives up-to-date information on the new suspicious features of the application being tested whenever the testing configuration changes. Accordingly, when the updated test report shows new suspicious features that the user wishes to avoid, the user may immediately choose to remove the application (consumer point of view) or modify the application (vendor point of view).

Figure 4:
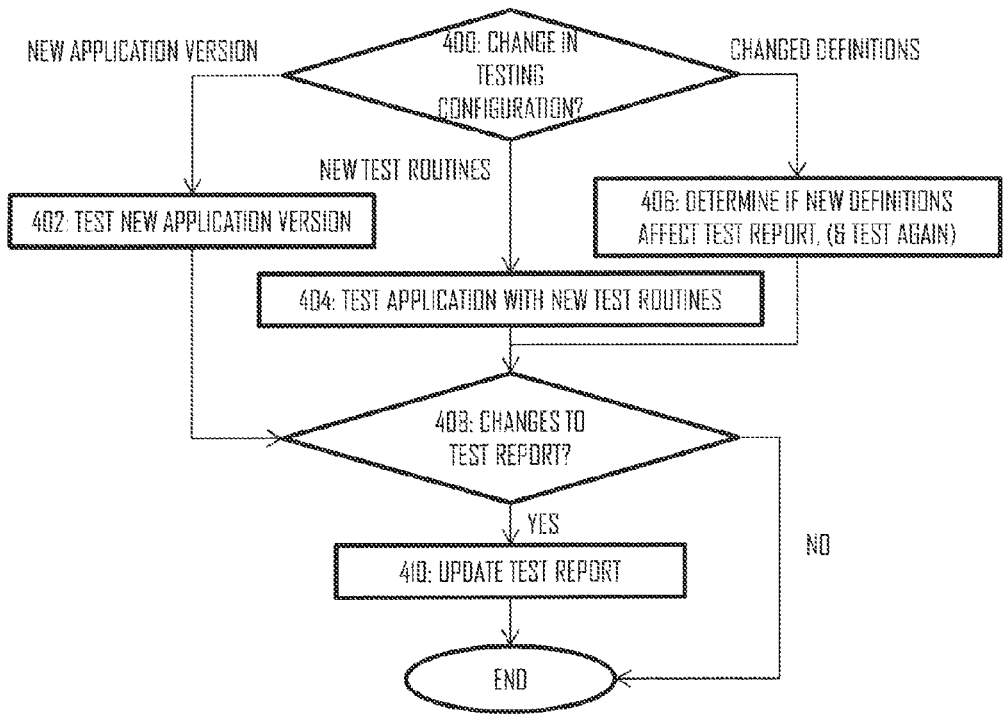

FIG. 4 illustrates an embodiment of block 306. In block 400, it is determined what type of change in the testing configuration has been detected. If the change is a change in the application itself, e.g. a new version of the application, the server computer 104 may carry out the test routines for the version of the application (block 402). If the change in the testing configuration comprises new test routines or changed test routines, the server computer may test the application with the new/changed test routines. If the change in the testing configuration comprises changes in the definitions of the suspicious behaviour, e.g. changes in malware definitions, the server computer 104 may determine whether or not the new definitions affect the test report (block 406). Block 406 may comprise carrying out at least some the test routines that use the new or changed definitions but, in some cases, the execution of the test routines is not necessary. For example, the test result database may comprise information on certificates comprised in the application, and if the change in the definitions is a change of a certificate from "trusted" to "untrusted", there is no need to carry out a test routine. Similarly, if the test result database comprises information on hosts that the application contacts during its operation and the change in the definitions is a change of a host from "trusted" to "suspicious", there is no need to carry out the test routines again. Accordingly, if the change in the definitions is a change in suspiciousness status of an instance used in testing the application, the retesting may be omitted. On the other hand, if the change in the definitions comprises new definitions or definitions whose effect on the test report cannot be derived without retesting, at least some of the test routines may be rerun in block 406. For example, if an application has contained a component or an operation that has not been identified or monitored and a new definition for a component or an operation becomes available, the testing may be rerun. The changed definitions may comprise at least one of the following: new known malicious sites or hacking attacks to sites accessed by the application, new security vulnerabilities become available for components (e.g. libraries) of the application, new more secure versions of used components become available, new known compromised (root) certificates, a new known malicious activity pattern, e.g. a malicious access to a specific file or a malicious system call, a new information on a service on which the application is dependent, e.g. such a service becoming unavailable.

Naturally, if the change comprises a plurality of above-mentioned changes, a corresponding combination of blocks 402 to 406 may be carried out. From the blocks 402 to 406, the process proceeds to block 408. If the change in the testing configuration changes the contents of the test report (block 408), the server computer 104 may change the test report accordingly and send the updated test report to the client device 100 (block 410).

In general, when the server computer detects a change in a testing configuration, it may first determine application(s) affected by the changed testing configuration. When the change is the new version of an application, only the revised application is affected. On the other hand, when the change is in the test routines or in the definitions, one or a plurality of applications may be affected and, accordingly, the server computer 104 may determine the applications associated with the changed test routines and/or the changed definitions. Then, the server computer may determine the user(s) of the affected application(s) on the basis of a database storing associations between the applications and the users that have requested to test their applications. Upon determining the user(s) that have been associated with the affected applications, the server computer 104 may determine those users that have a valid subscription for the long-term testing service. The server computer may then send the updated test report to only those users that have the valid subscription. To the other users, the server computer may automatically send a notification that the test configuration of the application has changed and that the new test report is available upon validating the subscription.

Figure 5:
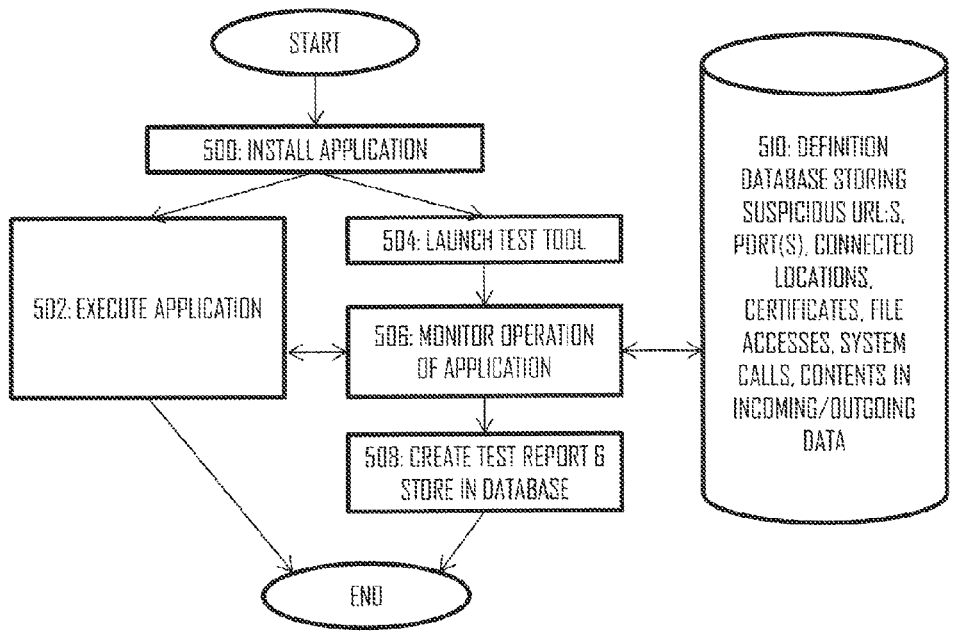
FIG. 5 is a flow diagram of a process for dynamic testing of the application according to an embodiment of the invention.
Figure 6:
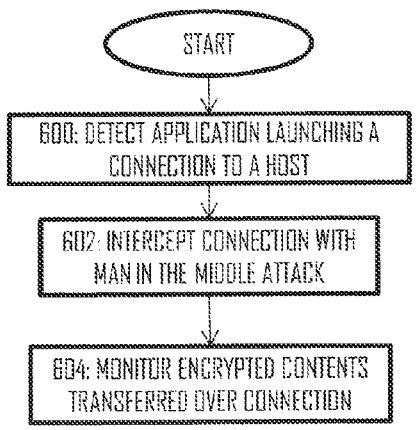
FIG. 6 is a flow diagram of a process for intercepting encrypted data traffic sent by the application according to an embodiment of the invention.
Figure 7:
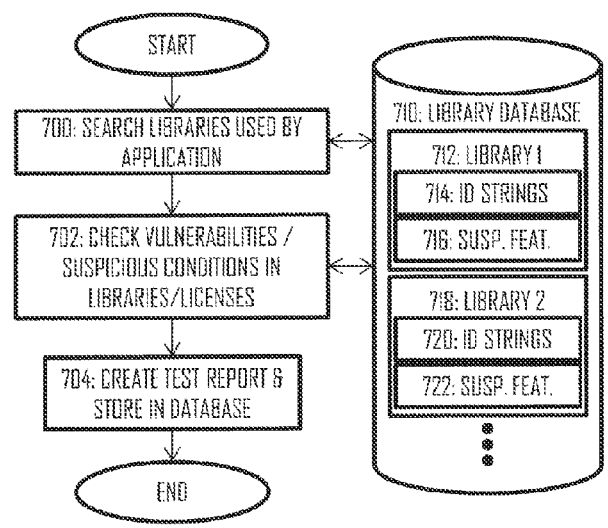
FIG. 7 is a flow diagram of a process for static testing of the application according to an embodiment of the invention.

Let us now consider some embodiments of the invention for testing the application in the server computer with reference to FIGS. 5 to 7. In the embodiments of FIGS. 5 and 6, the server computer 104 installs the application, executes it, and monitors its operation for the suspicious behaviour. In the embodiment of FIG. 7, the server computer 104 breaks down the application in to its components, in order to detect suspicious components in the computer program code.

Referring to FIG. 5, upon acquiring the installation package of the application, the server computer 104 installs the application to the server computer 104 in block 500. The application may be installed to a virtual machine or an emulator operated in the server computer 104. The virtual machine or the emulator may represent the environment to which the application is designed, e.g. an operating system or a platform. The virtual machine or the emulator may correspond to a system architecture of the client device 100 in the embodiments where the user intents to install the application to the client device 100. It should, however, be appreciated that in other embodiments, the virtual machine or the emulator may correspond to an architecture different from that of the client device 100, e.g. when the user is the vendor. The virtual machine or the emulator may be created by a computer program executed by the server computer 104.

In block 502, the server computer executes the installed application and, meanwhile, launches in block 504 a test tool configured to execute the plurality of test routines monitoring the operation of the application (block 506). Let us now consider some embodiments of functions monitored by the test routines with reference to block 506 and a definition database 510 stored in a memory unit of the server computer 104. The definition database may comprise reference definitions for the suspicious behaviour in terms of suspicious URLs (uniform resource locator), suspicious network ports, suspicious application ports, suspicious hosts, suspicious geographical locations accessed, suspicious certificates, suspicious file accesses (read, write, modify), suspicious system calls, suspicious contents of transferred data, suspicious features in files used, suspicious dependency on a service, etc. The test tool may comprise at least one test routine to test for whether or not the application comprises suspicious behaviour defined by the definition database 510. A test routine may monitor the network activity of the application. The test routine may monitor the URLs accessed by the application and compare the accessed URLs with the suspicious URLs comprised in the definition database. The test routine may store the accessed URLs in the test result database and write to the test report a notification if a suspicious URL has been found. The test routine may check the geographical location of the accessed URLs in order to detect whether or not the application accesses to unallowed geographical locations, e.g. hostile or malicious countries. The same or a different test routine may monitor network and/or application ports opened by the application and used in the operation. Malware may be known to use certain ports and/or IP addresses, and the definition database may store such information. This test routine may compare the port(s) and/or IP addresses used by the application with the suspicious ports and/or IP addresses, respectively, store the used ports and/or IP addresses in the test result database and include any suspicious ports and/or IP addresses in the test report.

The above-mentioned or a different test routine may monitor the contents of the network traffic transferred by the application. The test routine may apply a keyword or a string pattern search to the transferred data in order to detect whether or not the application transfers malicious data. The test routine may, for example, create a contact database, e.g. a phone book or an address list, and monitor the traffic for any string patterns comprised in the contact database in order to detect whether or not the application sends the contact database in a malicious manner. Similarly, the test routine may create an artificial credit card number and monitor whether or not the application attempts to make payments with the credit card number. In general, the test routine may detect whether or not the application transfers data that it should not transfer by definition. The test routine may store at least some identifiers or snap shots of the transferred data in the test result database and, if the application is detected to transfer data maliciously, the test routine may store a corresponding record in the test report.

A test routine may check what certificates or root certificates the application uses and compare the certificates with the suspicious certificates comprised in the definition database. The suspicious certificates may comprise expired certificates, self-signed certificates, certificates provided by a suspicious party, etc. The test routine may store the used certificates in the test result database and include the suspicious certificates in the test report.

A test routine may monitor content (MIME) or file accesses performed by the application. For example, if the application registers to the system as handling certain media or file types, e.g. portable document format files, the test routine may monitor whether or not the file accesses comprise malicious features or security vulnerabilities. The malicious features or security vulnerabilities may be defined by the definition database, and the test routine may attempt to detect this type of behaviour. The test routine may include in the test report any malicious features, attack vectors or surfaces, and/or security vulnerabilities detected.

A test routine may monitor system calls performed by the application. The definition database 510 may store suspicious system calls or combinations of suspicious system calls, and the test routine may compare the system calls performed by the application with the suspicious system calls. A system call may be defined as a call from the application to an operating system of the virtual machine or the emulator. The test routine may store the system calls in the test result database and include any suspicious system calls in the test report.

A test routine may monitor the dependency of the application on external web services. This may be part of monitoring the network activity or a separate test routine. The definition database 510 may store definitions on suspicious web services. The test routine may store in the test result database the web services used by the application and, if suspicious web services were found, the test routine may include them in the test report.

In an embodiment, at least one test routine provides a stimulus to the application and monitors for the response to the stimulus. The stimulus may comprise the above-mentioned credit card number or a telephone number, and the test routine may monitor whether or not the application applies suspicious operations to the stimulus, e.g. tries to send the telephone number to a suspicious host. The stimulus may comprise user inputs, e.g. arbitrary string inputs in order to detect whether or not the application monitors the words input by the user, or it may comprise other user input in order to detect any suspicious responses. The stimulus may comprise establishment of a communication connection, e.g. a voice call or a short message, and monitoring the response of the application to the communication connection. The stimulus may comprise running a boot sequence and monitoring how the application performs during the boot, e.g. whether or not the application makes any malicious operations during the boot. The stimulus may comprise network events, e.g. a notification of a discovery of a Wi-Fi network, a base station signal of a cellular telecommunication system, or a notification that a mobile phone is roaming in a foreign network, and the test routine may monitor whether or not the application responds in a suspicious manner to such inputs. The stimulus may comprise a change in a geolocation, and the test routine may monitor whether or not the change in the geolocation, e.g. a country, affects the operation of the application in a suspicious manner. In an embodiment, the user may specify what type of stimuli shall be input to the application during the testing. The test request may carry this information.

In an embodiment, a test routine monitors the operation of the application by capturing encrypted data transferred by the application and by determining on the basis of the captured, decrypted data whether or not the computer program application behaves suspiciously. The test routine may gain access to the encrypted data by directing a man in the middle (MITM) attack to a communication connection or a communication link established by the application. FIG. 6 illustrates a flow diagram of a procedure according to this embodiment. The process of FIG. 6 may be carried out as a part of block 506, for example. Referring to FIG. 6, the test routine detects in block 600 that the tested application attempts establishment of a connection to a host. The connection may be a network connection through the Internet, for example, e.g. a transport control protocol/Internet protocol (TCP/IP) connection, universal datagram protocol (UDP) link, or a real-time protocol (RTP) connection. In block 602, the test routine intercepts the communication link establishment procedure by performing a man in the middle attack. As the application is executed in the server computer 104, the test routine executed by the server computer is able to detect and intercept any messages transferred by the application, and it is also able to input arbitrary data to the application. As a consequence, the test routine is able to capture any encryption keys negotiated between the application and the host. For example, upon capturing from the application a request for the host to provide the host's public key, the test routine may, as a response, input to the application an arbitrary public key of the test routine itself. The test routine may also install a root certificate that verifies to the application that the public key belongs to the host. Therefore, upon the application sending a certification request to a certification authority, the test routine may capture the certification request and input a certification response to the application on the basis of the root certificate. Accordingly, the application believes that a trusted party has authenticated the host and that the application is truly communicating with the host. Then, the application encrypts any data it sends with the public key provided by the test routine, and the test routine may decrypt the encrypted data by using its private key matched with the public key. In this manner, the test routine may monitor any encrypted data sent by the application (604). The application may forward the captured data to the host in order to monitor further behaviour of the application and the further messages sent by the application. In another embodiment, the application may prevent the forwarding of the data sent by the application. Similarly, the test routine may capture and monitor the traffic from the host to towards the application, as conventionally known in connection with MITM attacks.

It should be appreciated that although various types of features and activity have been described herein, the test tool may monitor other type of activity as well. In block 508, the test report is created and stored in the test result database. With respect to the contents of the test report in connection with each type of suspicious behaviour described above, the test report may comprise simply a notification of whether or not the application has been detected to contain each type of suspicious behaviour, or a detailed description of suspicious behaviour may be provided for each type in the test report. For example, the test report may comprise a simple notification that the application access to at least one malicious host and, optionally, it may comprise URL(s) of such hosts or other detailed information further defining the suspicious behaviour. The level of detail of the test report may be defined by the user in connection with sending the test request.

The embodiments described above with reference to FIGS. 5 and 6 monitor the operation of the application. The embodiments of FIGS. 5 and 6 may be referred to as dynamic scanning for suspicious behaviour. It should be appreciated that embodiments of FIGS. 5 and 6 are directly applicable to the embodiments of FIGS. 3 and 4, i.e. the test routines of FIGS. 5 and 6 may be repeated when a change is detected in the testing configuration. Another embodiment scans components of the application and determines whether or not the application comprises suspicious components. Such embodiments may be considered to perform static scanning for the suspicious behaviour, since the embodiments scan the static components of the application. FIG. 7 illustrates a flow diagram of this embodiment.

Referring to FIG. 7, upon acquiring the application (block 204) a component extraction tool may be launched to determine what components the application comprises (block 700). The searched components may comprise libraries used by the application. As known in the art, a library is a collection of implementations of behaviour, written in a computer language. The library has an interface for communicating with other computer programs. As a consequence, the library may be considered as a modular tool that may be used by multiple independent programs. A computer program may invoke the library via a function call, for example. Different libraries provide different functions, and the application being tested may utilize the functions provided by the libraries comprised in the application during its operation. The component extraction tool may be a computer program executed by the server computer 104. The server computer 104 may store in its memory unit a library database 710 storing a reference list of libraries 712, 718 the component extraction tool is configured to search. The library database may comprise for each library 712, 718 reference strings 714, 720 that distinguish the library 712, 718 from other libraries. The component extraction tool may then scan the computer program code of the application for these reference strings 714, 720 and, upon detecting a string matching with a reference string, 714, 720, the component extraction tool may store in a test result database an information element indicating that the application comprises the detected library.

In an embodiment, the reference strings 714, 720 are binary strings, and the component extraction tool is configured to scan a binary computer program code of the application for the reference strings. As a consequence, the component extraction tool may scan compiled computer program code translated into a machine language instead of reading a source code of the application, for example.

In an embodiment, the component extraction tool 700 is configured to identify any software licenses associated with the application. The licenses may be determined from the detected libraries and known licenses associated with those libraries, or the licenses may be detected by other means. The library database 710 may store definitions for identifying the licenses from the computer program code of the application. Similarly, the library database 710 may store definitions for identifying any known patent rights etc. associated with the libraries for use in determining the suspicious features of the application.

In an embodiment, the reference list of at least one library 712, 718 may be divided into different versions, wherein separate reference strings 714, 720 and definitions of suspicious features 716, 722 are provided for each version. An application may contain multiple versions of the same library, and the component extraction tool may be configured to detect the different versions and store in the test result database information on the versions of the same library found in the application.

In block 702, upon the component extraction tool has determined the components of the application, the suspicious behaviour associated with the detected components is determined by cross-referencing the extracted components with the library database 710. The library database 710 may store in association with each library 712, 718 definitions of the suspicious behaviour 716, 722, respectively. The definitions may comprise at least one of the following for each library: known security vulnerabilities, possible common weakness enumeration (CWE) numbers for the known security vulnerabilities, known licenses and their terms of use, an author of the library and a reputation status of the author, an export control status of the library indicating whether or not the library may be exported freely, an age or a creation date of the library, a time of last known update of the library, certificates comprised in the library and a reputation status of the certificates and/or certificate providers, resources used by the library such as icons or images, network addresses used by the library, names or URLs inside the library, whether or not the library comprises debugging information attached to it, popularity of the library, and a message digest 5 (MD5) of the library or another factor to detect possible tampering of the library. Block 702 may comprise determining, on the basis of the definitions of the known suspicious behaviour associated with each library, whether or not the libraries comprised in the application and detected in block 700 are associated with the suspicious behaviour. The result of block 702 may be stored in the test result database and in the test report (block 704). The test report may comprise information on libraries that are associated with the suspicious behaviour and/or what type of suspicious behaviour is associated with the application and/or individual libraries. For example, if one or more of the libraries has been detected to contain security vulnerabilities, the test report may be arranged to comprise information on the type of security vulnerability, e.g. whether or not the library or the application is detected to be malicious or susceptible to malicious attacks. As another example, if one or more libraries are detected that are under a license, the test report may comprise information on the license terms or a reference to a web site where the license terms are listed. Similar procedure may be applied to libraries that are subject to patent rights. Table 1 below shows an embodiment of some contents of the test report.

TABLE 1

| Libraries with Known Vulnerabilities | |
| --- | --- |
| openssl 0.9.8j | 30 vulnerabilities |
| libtiff | 9 vulnerabilities |
| libtiff version 3.8 | 8 vulnerabilities |
| libpng | 10 vulnerabilities |
| Libraries without Known Vulnerabilities | |
| libjpeg | — |
| sqlite3 | — |
| Licenses with Significant Conditions | |
| License 1 | Obligation to release source code |
| Licenses without Significant Conditions | |
| License 2 | — |

The embodiment of FIG. 7 may be directly combined with the embodiments of FIGS. 3 and 4, e.g. when there is a change in the testing configuration, the server computer 104 may determine the effect of the change on the test report and update the test report accordingly. For example, if the application version changes, the process of FIG. 7 may be executed again in order to determine what new libraries or components are comprised in the new version of the application and whether or not the status of the suspicious behavior of the application indicated in the test report has changed. Similarly, if new information on the libraries is acquired and the definitions 716, 722 change, e.g. new vulnerabilities are found in a library or new versions of the libraries have become available, the server computer 104 may determine its effect on the test report, update the test report, and send the updated test report to the user. In general, the server computer 104 may determine the applications that are affected by the change, update their test reports and test result databases, and send the updated test reports to the users that have a valid subscription.

Figure 8:
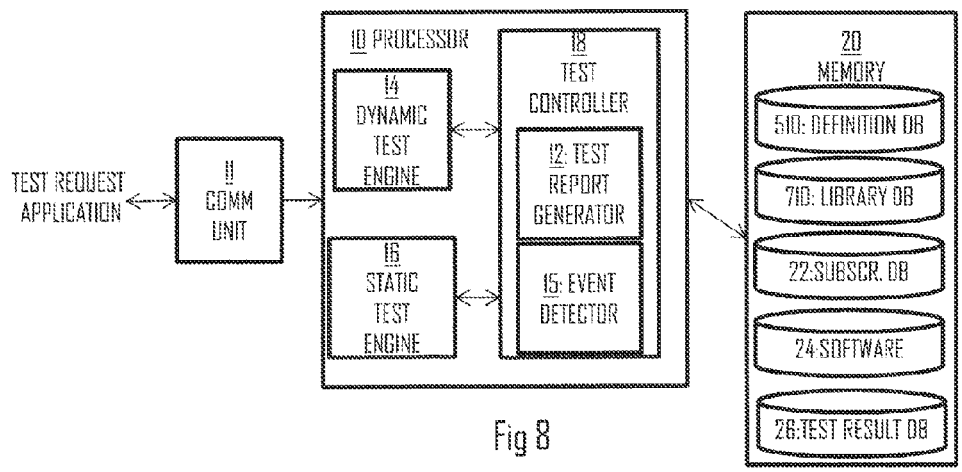
FIG. 8 illustrates a block diagram of a structure of an apparatus according to an embodiment of the invention.

FIG. 8 illustrates a block diagram of a structure of an apparatus according to an embodiment of the invention. The apparatus may be comprised in the server computer 104. The apparatus may be a computer, e.g. a network server or a workstation computer, comprising at least one processor 10 and at least one memory 20 including a computer program code 24, wherein the at least one memory 20 and the computer program code 24 are configured, with the at least one processor 10, to cause the apparatus to carry out the steps of the process of FIG. 2 executed by the server computer or any one of the embodiments described above and executed by the server computer 104.

Referring to FIG. 8, the apparatus comprises a communication unit 11 operating according to at least one communication protocol. The communication unit 11 may be configured to establish TCP/IP, UDP, or RTP connections, for example. It should, however, be appreciated that the communication protocol used between the client device 100 and the server computer 104 does not limit the invention in any way. The apparatus may further comprise the memory 20 comprising the definition database 510 used as a reference when monitoring the operation of the application (see description referring to FIGS. 5 and 6) and/or the library database 710 storing the reference strings 714, 720 for identifying the components of the application and definitions for suspicious features of each component. The memory 20 may further store a subscription database 22 storing information on the users subscribed to the testing service (e.g. contact details), applications tested and associations between the applications and the users, the type of subscription for each user (e.g. long-term continuous subscription spanning over multiple test operations or a one-shot subscription consisting of one testing of an application). The memory 20 may further store computer program code 24 defining the operation of the server computer 104 in connection with testing the applications, handling the subscriptions, updating the testing configuration, etc. The memory 20 may further comprise the test result database 26 storing any information acquired during the testing of the application, as described above.

The apparatus may further comprise the processor 10 or a processing circuitry 10 configured to carry out the test operations and provide the testing service, as described above. The processor may be considered to encompass all of the following: (a) hardware-only circuit implementations such as implementations in only analogue and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor (s) or a portion of a microprocessor(s), that require software or firmware for operation, even if the software or firmware is not physically present. This definition of the "processor" applies to all uses of this term. As a further example the term "processor" would also cover an implementation of multiple processors or portion of a processor, e.g. one core of a multicore processor, and its (or their) accompanying software and/ or firmware. It may be understood to encompass also an application-specific integrated circuit (ASIC), and/or a field-programmable grid array (FPGA) circuit for the apparatus according to an embodiment of the invention.

The processor 10 may acquire the application to be tested through the communication unit 11 from the client device 100 or from an URI specified by the client device 100. The processor 10 may comprise or perform functions of a dynamic test engine 14 configured to install the application, execute the application, and monitor the operation of the application, as described above with reference to FIGS. 5 and 6. The dynamic test engine may access the definition database 510 in order to identify the suspicious behaviour in the operation of the application. The processor 10 may comprise or perform functions of a static test engine 16 configured to detect the components of the application from the computer program code of the application and to detect suspicious behaviour associated with the detected components, as described above with reference to FIG. 7. The static test engine 16 may access the library database 710 in order to identify the suspicious behaviour in the components of the application. It should be appreciated that the processor may comprise one of the dynamic test engine 14 and the static test engine 16, both of them, or even another type of test engine configured to test the application and detect suspicious behaviour associated with the application. The test engines 14, 16 may update the test result database as they test the application. They may store in the test result database 26 detected suspicious behaviour of the application but also any information describing the operation and/or the components of the application, e.g. network activity, accessed sites, accessed files, system calls, certificates of the application, etc.

The processor 10 may comprise or execute functions of a test controller 18 controlling the overall operation of the testing. The test controller 18 may carry out the communication with the client device 104, receive the test request and update the subscription database with the contents of the test request, e.g. create a new client profile, update applications tested for the user, etc. The test controller 18 may acquire the application to be tested and, upon acquiring the application, launch the dynamic test engine 14 and/or the static test engine 16. When the test controller 18 receives a notification from the test engine(s) 14, 16 that the testing is complete, the test controller may launch a test report generator 12 configured to create the test report. The test report generator may access the test result database 26 and acquire all the information comprised in the test result database 26 or a subset of the information contained in the test result database and add the acquired information to the test report. The test report generator 12 may use a default template for the contents of the test report, or the test report generator may select the information to be inserted to the test report on the basis of user preferences received from the client device 100. Upon completing the test report, the test report generator 12 may control the communication unit 11 to send the test report to the client device 100 over the communication connection established before sending the test request, or store the test report in the test subscription database and notify the user of the completed test report, e.g. via e-mail. Accordingly, the testing may be carried out online while the user is waiting, or it may be carried offline, e.g. the connection between the client device and the server computer may be terminated, and the test report may be sent over another connection.

The test controller 18 may further comprise an event detector 15 configured to monitor the testing configurations and to alert the test controller 18 upon detecting a change in a testing configuration of any application, e.g. new application version, installation of new test routines to the test engines 14, 16, updates in the definition databases 510, 710, etc. As a result, the test controller may start a procedure to determine whether or not the changes affect the test results, e.g. whether or not there is a need to carry out retesting at least on some level. Above, some embodiments are described, e.g. the retesting may comprise simple update of the test report(s) when a certificate changes from trusted to untrusted or vice versa, or the retesting may comprise launching the test engine (s) 14, 16 to carry out retesting of the application. When the retesting causes a change in a test report sent to a user having a valid subscription, the test controller 18 may control the communication unit 11 to transmit a notification about the updated test report to the user.

The processes or methods described in connection with FIGS. 2 to 7 may also be carried out in the form of one or more computer processes defined by one or more computer programs. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to software testing systems. The algorithms used, the definitions of the suspicious behaviour, and testing tools develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for testing a computer program application in a server computer, the method comprising:
   having a library database comprising library reference strings that distinguish each library from other libraries, the library database further storing known suspicious features of libraries;
   upon receiving a test request requesting the server computer to test suspicious behaviour associated with the computer program application, performing the method by:
   acquiring the computer program application on a basis of the test request;
   applying at least one test routine to the computer program application and testing for suspicious behaviour associated with the computer program application, wherein said testing comprises installing the computer program application to the server computer, executing the computer program application, searching a computer program code of the computer program application for the library reference strings, determining one or more libraries invoked by the computer program application on the basis of the library reference strings found in the computer program code of the computer program application, cross-referencing the library database with the libraries invoked by the computer program application and determining, on the basis of the comparison, whether or not the computer program application comprises one or more of the suspicious features, monitoring an operation of the computer program application and comparing behaviour;
   creating a test report specifying at least some of the suspicious features, if any found during the at least one test routine, and inserting results of said monitoring into the test report; and
   communicating the test report.

2. The method of claim 1, further comprising in the server computer:
   subscribing a user of a client device to a testing service of the computer program application, wherein the testing service lasts beyond the communication of the test report;

detecting, autonomously by the server computer, a change in at least one parameter comprised in said testing the computer program application;

determining whether or not the changed at least one parameter results in change of contents of the test report; and upon determining that the change in the at least one parameter causes a change in the contents of the test report, creating a new test report that takes into account the changed at least one parameter and communicating the new test report to the client device as a part of the subscription.

3. The method of claim 2, further comprising:

detecting said change in a program version of the computer program application;

applying said at least one test routine to a new version of the computer program application and testing the suspicious behaviour associated with the new version of the computer program application;

creating said new test report on the basis of the at least one test routine applied to the new version of the computer program application.

4. The method of claim 2, further comprising:

detecting said change in the at least one test routine applied to the computer program application;

applying the changed test routines to the computer program application and testing the suspicious behaviour associated with the computer program application;

creating said new test report on the basis of the changed at least one test routine applied to the computer program application.

5. The method of claim 2, further comprising:

detecting said change in definitions of the suspicious behaviour;

determining whether or not the definitions cause a change to the test report;

upon determining that the test report changes as a result of the changed definitions, creating said new test report on the basis of the changed definitions.

6. The method of claim 1, said monitoring the operation of the computer program application comprising:

capturing encrypted data transferred by said computer program application by directing a man in the middle attack to a communication connection established by the computer program application; and determining on the basis of the captured data whether or not the computer program application behaves suspiciously.

7. The method of claim 6, further comprising:

providing the computer program application with a public key and indicating that the public key belongs to a host to which the computer program application established the communication connection; and providing, in connection with the public key, the computer program application with a root certificate that verifies that the public key belongs to the host.

8. The method of claim 1, wherein the computer program code from which reference strings are searched for, is compiled binary computer code.

9. The method of claim 1, further comprising determining the libraries comprised in the computer program application without installing the application to the server computer.

10. The method of claim 1, wherein said applying the at least one test routine comprises:

searching the computer program application for computer program licenses associated with said computer program application;

determining whether or not licenses associated with the computer program application comprise suspicious features; and inserting results of said determining suspicious features of the licenses into the test report.

11. The method of claim 1, further comprising:

creating, on the basis of testing the computer program application, a database storing the test results and specifications identifying the tested computer program application;

storing the database in the server computer for later use.

12. An apparatus comprising:

at least one processor; and at least one memory storing a computer program code and a library database comprising library reference strings that distinguish each library from other libraries, the library database further storing known suspicious features of libraries, wherein the at least one memory and the computer program code are configured, with the at least one processor, to cause the apparatus to:

receive a test request requesting the apparatus to test suspicious behaviour associated with a computer program application;

acquire the computer program application on a basis of the test request;

apply at least one test routine to the computer program application and test for suspicious behaviour associated with the computer program application, wherein said test comprises at least the following performed by the apparatus: installing the computer program application, executing the computer program application, searching a computer program code of the computer program application for the library reference strings, determining one or more libraries invoked by the computer program application on the basis of the library reference strings found in the computer program code of the computer program application, cross-referencing the library database with the libraries invoked by the computer program application and determining, on the basis of the comparison, whether or not the computer program application comprises one or more of the suspicious features, monitoring an operation of the computer program application and comparing the operation with known suspicious behaviour;

create a test report specifying at least some of the suspicious features, if any found during the at least one test routine, and insert results of said monitoring into the test report; and communicate the test report.

13. The apparatus of claim 12, wherein the at least one memory and the computer program code are configured, with the at least one processor, to cause the apparatus to:

subscribe a user of a client device to a testing service of the computer program application, wherein the testing service lasts beyond the communication of the test report;

detect, autonomously, a change in at least one parameter comprised in said testing the computer program application;

determine whether or not the changed at least one parameter results in change of contents of the test report; and upon determining that the change in the at least one parameter causes a change in the contents of the test report, create a new test report that takes into account the changed at least one parameter and communicating the new test report to the client device as a part of the subscription.

14. The apparatus of claim 13, wherein the at least one memory and the computer program code are configured, with the at least one processor, to cause the apparatus to:
- detect said change in a program version of the computer program application;
- apply said at least one test routine to a new version of the computer program application and test the suspicious behaviour associated with the new version of the computer program application;
- create said new test report on the basis of the at least one test routine applied to the new version of the computer program application.

15. The apparatus of claim 13, wherein the at least one memory and the computer program code are configured, with the at least one processor, to cause the apparatus to:
- detect said change in the at least one test routine applied to the computer program application;
- apply the changed test routines to the computer program application and test the suspicious behaviour associated with the computer program application;
- create said new test report on the basis of the changed at least one test routine applied to the computer program application.

16. The apparatus of claim 13, wherein the at least one memory and the computer program code are configured, with the at least one processor, to cause the apparatus to:
- detect said change in definitions of the suspicious behaviour;
- determine whether or not the definitions cause a change to the test report;
- upon determining that the test report changes as a result of the changed definitions, create said new test report on the basis of the changed definitions.

17. The apparatus of claim 12, wherein the at least one memory and the computer program code are configured, with the at least one processor, to cause the apparatus to perform at least the following when monitoring the operation of the computer program application:
- capture encrypted data transferred by said computer program application by directing a man in the middle attack to a communication connection established by the computer program application; and
- determine on the basis of the captured data whether or not the computer program application behaves suspiciously.

18. The apparatus of claim 17, wherein the at least one memory and the computer program code are configured, with the at least one processor, to cause the apparatus to:
- provide the computer program application with a public key and indicating that the public key belongs to a host to which the computer program application established the communication connection; and
- provide, in connection with the public key, the computer program application with a root certificate that verifies that the public key belongs to the host.

19. A computer program product embodied on a non-transitory distribution medium readable by a computer and comprising program instructions which, when loaded into an apparatus, execute a computer process comprising:
- storing a library database comprising library reference strings that distinguish each library from other libraries, the library database further storing known suspicious features of libraries;
- receiving a test request requesting the apparatus to test suspicious behaviour associated with a computer program application;
- acquiring the computer program application on a basis of the test request;
- applying at least one test routine to the computer program application and testing for suspicious behaviour associated with the computer program application, wherein said testing comprises installing the computer program application, executing the computer program application, searching a computer program code of the computer program application for the library reference strings, determining one or more libraries invoked by the computer program application on the basis of the library reference strings found in the computer program code of the computer program application, cross-referencing the library database with the libraries invoked by the computer program application and determining, on the basis of the comparison, whether or not the computer program application comprises one or more suspicious features, monitoring an operation of the computer program application and comparing the operation with known suspicious behaviour;
- creating a test report specifying at least some of the suspicious features, if any found during the at least one test routine, and inserting results of said monitoring into the test report; and
- communicating the test report to the client device.

* * * * *